(12) United States Patent
Teplitsky et al.

(10) Patent No.: US 8,156,474 B2
(45) Date of Patent: Apr. 10, 2012

(54) AUTOMATION OF SOFTWARE VERIFICATION

(75) Inventors: Marat Teplitsky, Rishon Le-Zion (IL); Meir Ovadia, Natanya (IL); Noa Gradovich, Givatayim (IL)

(73) Assignee: Cadence Design Systems, Inc., San Jose, CA (US)

( * ) Notice: Subject to any disclaimer, the term of this patent is extended or adjusted under 35 U.S.C. 154(b) by 1083 days.

(21) Appl. No.: 11/966,834

(22) Filed: Dec. 28, 2007

(65) Prior Publication Data

US 2009/0172649 A1    Jul. 2, 2009

(51) Int. Cl.
*G06F 9/44* (2006.01)

(52) U.S. Cl. ........ 717/124; 717/126; 717/140; 717/142; 717/143; 714/38.1

(58) Field of Classification Search .................. None
See application file for complete search history.

(56) References Cited

U.S. PATENT DOCUMENTS

| | | | | |
|---|---|---|---|---|
| 4,802,091 A * | 1/1989 | Cocke et al. | ................. | 717/160 |
| 5,325,533 A * | 6/1994 | McInerney et al. | ........... | 717/107 |
| 5,452,457 A * | 9/1995 | Alpert et al. | ................. | 717/153 |
| 5,530,964 A * | 6/1996 | Alpert et al. | ................. | 717/158 |
| 5,655,073 A | 8/1997 | Nishikado et al. | | |
| 5,774,726 A * | 6/1998 | Ahmed | ......................... | 717/143 |
| 5,838,948 A | 11/1998 | Bunza | | |
| 6,029,262 A * | 2/2000 | Medd et al. | .................... | 714/724 |
| 6,038,378 A * | 3/2000 | Kita et al. | .................. | 714/38.11 |
| 6,161,217 A * | 12/2000 | Detlefs et al. | ................. | 717/141 |
| 6,182,258 B1 | 1/2001 | Hollander | | |
| 6,321,376 B1 | 11/2001 | Willis et al. | | |
| 6,347,388 B1 | 2/2002 | Hollander | | |
| 6,550,057 B1 * | 4/2003 | Bowman-Amuah | .......... | 717/126 |
| 7,000,224 B1 | 2/2006 | Osborne et al. | | |
| 7,051,303 B1 * | 5/2006 | Lam et al. | ...................... | 716/106 |
| 7,657,877 B2 * | 2/2010 | Vorbach et al. | ............... | 717/141 |
| 7,681,184 B1 | 3/2010 | Weedon et al. | | |
| 7,689,973 B2 * | 3/2010 | Kwong et al. | ................ | 717/126 |
| 7,702,958 B2 * | 4/2010 | Kwong et al. | ................ | 714/38.1 |
| 7,810,081 B2 * | 10/2010 | Dickenson et al. | ........... | 717/140 |
| 2002/0073375 A1 | 6/2002 | Hollander | | |
| 2004/0216023 A1 | 10/2004 | Maoz et al. | | |
| 2004/0243984 A1 * | 12/2004 | Vorbach et al. | ............... | 717/136 |
| 2005/0039079 A1 | 2/2005 | Higashi et al. | | |
| 2005/0165597 A1 | 7/2005 | Nightingale | | |
| 2005/0246693 A1 * | 11/2005 | Plum | ............................ | 717/140 |
| 2007/0277130 A1 | 11/2007 | Lavelle | | |
| 2008/0016396 A1 | 1/2008 | Higashi et al. | | |
| 2008/0215768 A1 * | 9/2008 | Reid et al. | ....................... | 710/22 |

(Continued)

OTHER PUBLICATIONS

Title: Random program generator for Java JIT compiler test system, author:Yoshikawa, T, source: IEEE, dated: Nov. 6, 2003.*

(Continued)

*Primary Examiner* — Chameli Das
(74) *Attorney, Agent, or Firm* — Vista IP Law Group, LLP (57) ABSTRACT

A method, system, and computer program product are disclosed for automatic test generation for a compiler. In one approach, the method, system and computer program product represent a test case for the compiler in a structure with one or more elements of a programming language, associate at least one syntactic rule and semantic rule with the one or more elements in the structure, create a test with the structure compiling the test with the compiler, and display results of the test.

18 Claims, 7 Drawing Sheets

U.S. PATENT DOCUMENTS

2008/0271001 A1* 10/2008 Nonomura et al. ............ 717/143
2009/0125882 A1* 5/2009 Frigo et al. .................... 717/116

OTHER PUBLICATIONS

Title: Automatic generation of provably correct parallelizing compilers, author: Gupta, G, source: IEEE, dated: Aug. 10, 1998.*

Saini, et al., Co-Verification Methodology for Platform FPGAs, Feb. 22, 2005, EE Journal.

Andrews, J., Coverage Driven Methodology for Verification of SoC Hardware and Software Corner Cases, 2006.

Halls, G., Hardware Software co-verification using Coverage Driven Verification Techniques, 2005.

Zwingenberger, E., Extending a coverage driven verification environment with real software, Micronas, CDNLive! EMEA, Nice, France, Jun. 25-27, 2006.

Andrews, J., Co-Verification of Hardware and Software for ARM SoC Design, Aug. 30, 2004, Newnes, pp. 1-288.

Hanford, K. V., Automatic generation of test cases, IBM Systems Journal, 1970, vol. 9, Issue 4, pp. 242-257.

Esin, A., et al., Experiments on Semantics Based Testing of a Compiler, 2008.

Zelenov, S., et al., Test Generation for Compilers and Other Formal Text Processors, Programming and Computer Software, vol. 29, No. 2, Nov. 19, 2003.

Non-Final Office Action dated Nov. 26, 2010 for U.S. Appl. No. 12/242,491.

Final Office Action dated May 11, 2011 for U.S. Appl. No. 12/242,491.

Non-Final Office Action dated May 20, 2011 for U.S. Appl. No. 11/949,553.

Final Office Action dated Jan. 17, 2012 for U.S. Appl. No. 11/949,553.

Winterholer, M., Transaction-based Hardware Software Co-verification, FDL'06 (Sep. 2006).

* cited by examiner

AUTOMATION OF SOFTWARE VERIFICATION

FIELD

The present invention relates to software verification.

BACKGROUND

The goal of software verification is to ensure that error free software has been produced and is an essential part of software development. Software verification is generally accomplished with "Black-Box Testing." Black-Box Testing consists of activating a software application with a set of inputs or test-cases, and comparing the output produced by the software application to the expected output from the software application. To ensure that a software application is error free, a set of possible test-cases are created for the software application and used to activate the software application under test with the test-cases. Large scale software applications tend to require a vast number of test-cases with an infinite number of permutations of inputs. However, it is often impractical for one to manually create a set of all possible inputs and permutations of inputs for the test-cases, and therefore, automatic verification is a preferred approach for testing large scale software applications.

A compiler is a computer program that translates a high level programming language, such as C++ or JAVA, into a lower level language, such as machine code, assembly, or an intermediate bytecode form that can run on a virtual machine. A compiler checks for errors in the input program files that are to be translated by the compiler. When a compiler discovers an error in the input program file that is being compiled, the compiler may indicate both the error and the occurrence of an error during the compilation. When a compiler successfully translates the input file, an executable is generated.

A compiler is verified by compiling a set of programs or test-cases with the compiler, and comparing the output from the compiler with the expected output of the compiler. Theoretically, a complete verification of a compiler requires a set of all possible test-cases. However, there are an infinite number of computer programs that can be compiled such that a complete verification of a compiler is unachievable. A practical approach for compiler verification is to create output producing test-cases that contain all words in the high level programming language and all the possible combinations of the words or statements in the language. The verification of all the words, elements, and statements, defined as a combination of elements in a programming language, of a programming language is referred to as checking the "syntax." Verification of a compilers' ability to handle the syntax of a programming language alone is insufficient because the compiler must handle the semantic constraints of the programming language.

The semantics of a programming language takes in to consideration the context, the surrounding statements or environment for the statement or element in the program. For example, it is possible that an action or statement may be correct within a loop construct in the language but the same action or statement may be incorrect within a conditional "if" statement construct. Semantics are an important part of a high level programming language because the sentences or statements in the program are dependent upon each other. For example, in some high level programming languages, the statement "x=5;" cannot be written in the program without first declaring "int x;" in the program. Such semantic checks are called "Static Semantics." In some programming languages, the statement "x=y/z" cannot be written when 'z' is equal to zero. These types of checks are "Dynamic Semantics" checks because the checks involve evaluation rules of the language.

Compiler verification is done by compiling and running test-cases with predicted run results and comparing them to the actual run results at the end. Compiler verification must contain both legal and illegal test-cases for complete verification of the ability for the compiler to handle the syntax and semantics of the high level programming language. Illegal test-cases may be input to the compiler in order to verify the error-handling ability of the compiler. Legal test-cases may be input to the compiler to test the compiler's ability to generate and executable. As a result, complete compiler verification may require tens of thousands of test-cases to cover every possible test-case.

An approach for compiler verification is the manual creation of program files and an expected output file corresponding to each program file. Approaches involving manual creation of test-cases may not handle all the relevant cases and make it difficult to handle updates of the programming language because the programs and expected output files must be manually altered. Obviously, the large amount of possible test-cases makes it impossible for human to cover all the scenarios.

Automation of compiler verification, involving the generation of test-cases, that is capable of programming meaningful test-cases with algorithms that mimic those created by a programmer of a high level language in order to test the semantics of the programming language requires an extremely high level of Artificial Intelligence (AI). The complexity involved in developing such an AI solution for compiler verification makes such an approach infeasible. Yet, testing a compiler without semantic checks on meaningful test cases does not allow for an accurate verification of the compiler. Thus, the ability to automate compiler verification would significantly increase the verification quality, while reducing the time it consumes.

SUMMARY OF THE INVENTION

A method, system, and computer program product are disclosed for automatic test generation for a compiler. In one approach, the method, system and computer program product represent a test case for the compiler in a structure with one or more elements of a programming language, associate at least one syntactic rule and semantic rule with the one or more elements in the structure, create a test with the structure compiling the test with the compiler, and display results of the test.

BRIEF DESCRIPTION OF THE DRAWINGS

The invention is illustrated by way of example and not limitation in the figures of the accompanying drawings, in which like references indicate similar elements and in which.

DETAILED DESCRIPTION

The present invention is directed toward methods, systems, and computer program products for automatic generation of compiler tests.

Embodiments of the present invention implement automatic generation of compiler tests in order to verify the compiler. A test for a compiler is a computer program, source code, or portion of a computer program written in the programming language supported by the compiler. The automatic test generator creates tests for a compiler with testcases that cover the interesting semantic and syntactic scenarios supported by the programming language.

Figure 1:
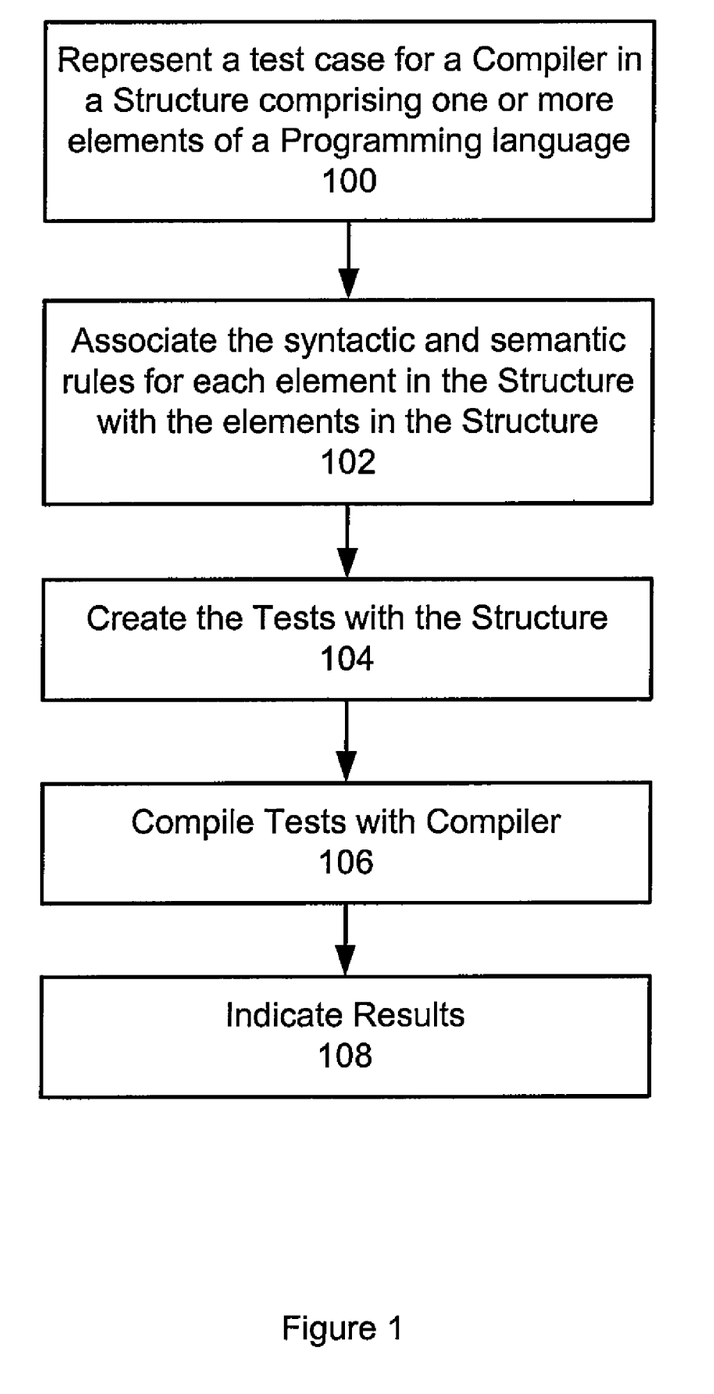
FIG. 1 is a flowchart for an implementation of an automatic test generator of a compiler.

FIG. 1 is a flowchart for an implementation of an automatic test generator for a compiler. Initially, a test-case for a compiler is represented in a structure comprising one or more elements of a programming language (100). The programming language elements in the test-case may be randomly selected or the user may designate an aspect of the programming language that the user desires to test. The user may designate the test of elements supported by the language, such as classes, if-then statement, for loops, templates, and structs. In one or more embodiments, the compiler verification may be implemented for the e programming language, and the user may designate the test of elements of the language, such as aspect oriented structs, method extensions, and computed macros. The language elements may be expressions or actions supported by the programming language, and each element may be composed of one or more sub-elements that form the expression or action. For example, an action in a programming language may be an if-then statement and an expression may be a "<" or "less than" comparison. In one or more embodiments, the structure is a tree composed of nodes, with each node representing an element of the programming language in an expression or action. For example, the following if-then action statement "if (a<b) {println;}" would have a tree structure with nodes for elements of the action if-then statement and the expression "(a<b)." Those skilled in the art will recognize that any type of data structure may be implemented to represent the elements of the programming language supported by the compiler that is being verified.

Next, the syntactic and semantic rules for each element of the programming language are associated with the elements in the structure that correspond to the rules for the elements of the programming language (102). Each element of the structure may have rules that restrict the elements related to that particular element. Related elements are connected to the element in the hierarchical structure. In one or more embodiments, the structure is a syntax tree, a hierarchy of nodes or elements that abide by the syntax rules of the programming language. For example, a syntax tree is created by starting with a root node or element, and each element becomes responsible for creating its' own subtree. An element selects the syntactic properties of its' child nodes, such as the "+" element that may have two "expression" child nodes. The semantic manager may use the context information and semantic filters to create a legal instance of each element.

The syntactic rules may be defined in a class definition for the element or node, and the semantic rules may be associated with the element or node when the element or node is instantiated with the class constructor during the creation of the tree or structure. When the syntax tree is created, the elements of the syntax tree may be instantiated with the class constructors for the elements in the class definition thereby associating the semantic rules with the elements of the syntax tree. In one or more embodiments, a semantic manager may associate the semantic rules with the elements of a syntax tree. A semantic manager may use the rules associated with each element to call methods that filter out illegal elements or sub-elements to be created for that element. In some embodiments, a semantic manager may be implemented with a factory design pattern. Each parent element may call the semantic manager associated with the parent element to filter or select legal sub-elements for the parent element.

The tests for the compiler may then be created using the structure (104). Embodiments of the invention may create the test for the compiler by stepping through the elements in the structure and writing the necessary statements, lines of source code, or portions of statements in the test file for each of the elements in the structure. The statements written to the test file may be incorrect usage of the elements of the programming language in the structure to test the error handling of the compiler under test. Optionally, the elements may provide information on the statements that can be placed in the test files which can be displayed to the user to alert the user of the progress of the current generation of the test file.

After the tests have been created, the tests may then be compiled with compiler (106), and the results from the compilation are indicated. The results may be displayed or stored for later access (108). In one or more embodiments, the test file may include statements that display the success or failure of the compilation of the test. Embodiments may generate tests that have statements within the test that allow for writing to standard error or an output file with the results of the compilation of the test. An output file may be used for comparison with an expected output file to verify the compiler in regards to the particular test.

Figure 2:
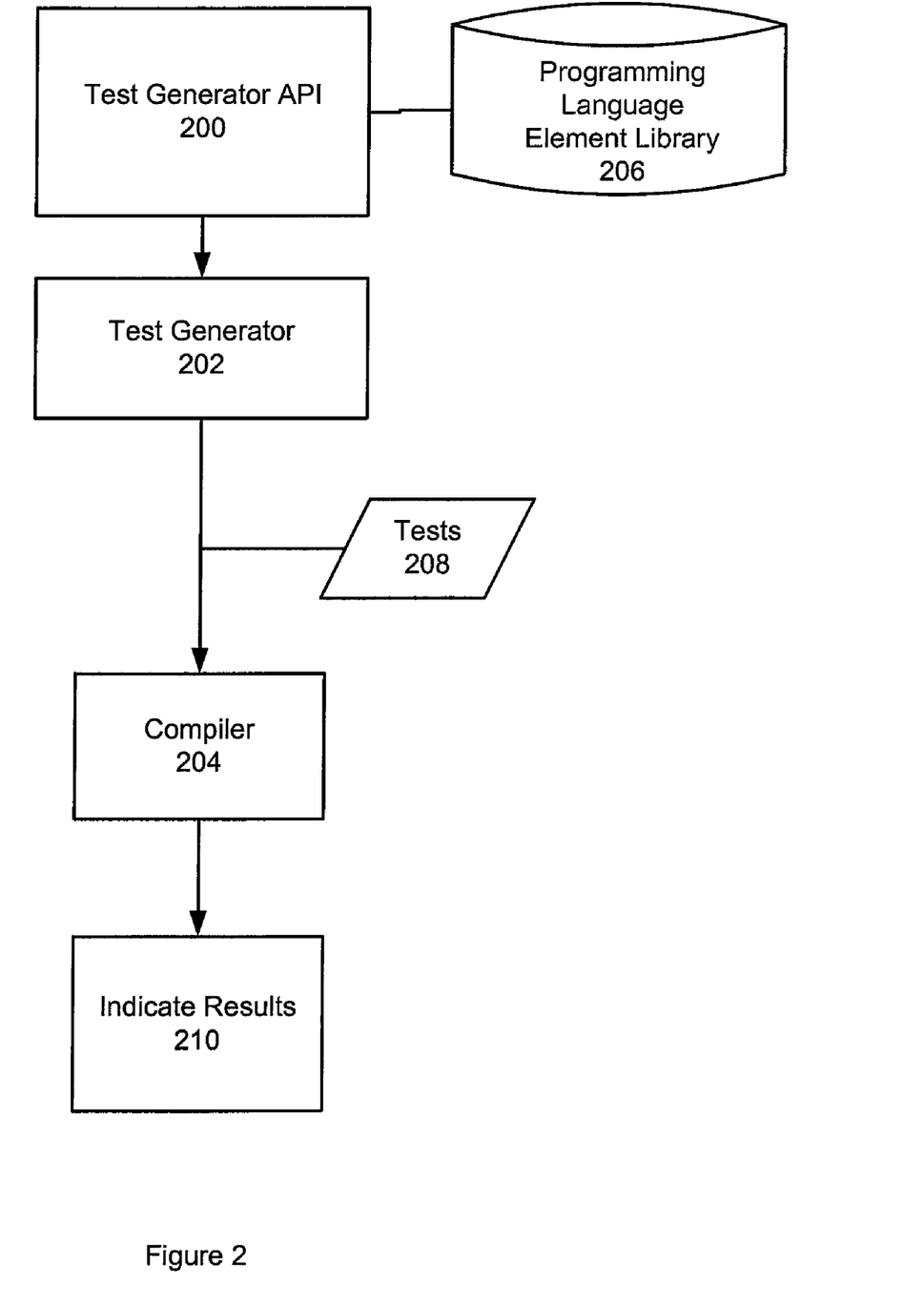
FIG. 2 is a block diagram of the functionality of an automatic test generator for a compiler.

FIG. 2 is a block diagram of the functionality for an approach for automatic test generator for a compiler. A Test Generator Application Programming Interface (API) 200 is provided for the Test Generator 202 to allow for the specification of the constraints of the programming language supported by the Compiler 204 to be tested. The Test Generator 202 is described in detail below with the description of FIG. 3. A user may define the syntactic and semantic constraints of each element of the programming language supported by the compiler with the Test Generator API 200. The user defined syntactic and semantic constraints of the programming language can be stored in a Programming Language Element Library 206. The Test Generator 202 will use the definitions for the syntax and semantics of the elements of the programming language stored in the Programming Language Element Library 206 to represent a test-case for the Compiler 204. The Test Generator 202 may be used to create one or more Tests 208, programs in the programming language supported by the compiler, for the Compiler 204. The Tests 208 are used as input for the Compiler 204 and the Results 210 for the Tests 208 are indicated to the user. The Results 210 may be made available by displaying the results to the user or storing the Results 210 in a database.

Figure 3:
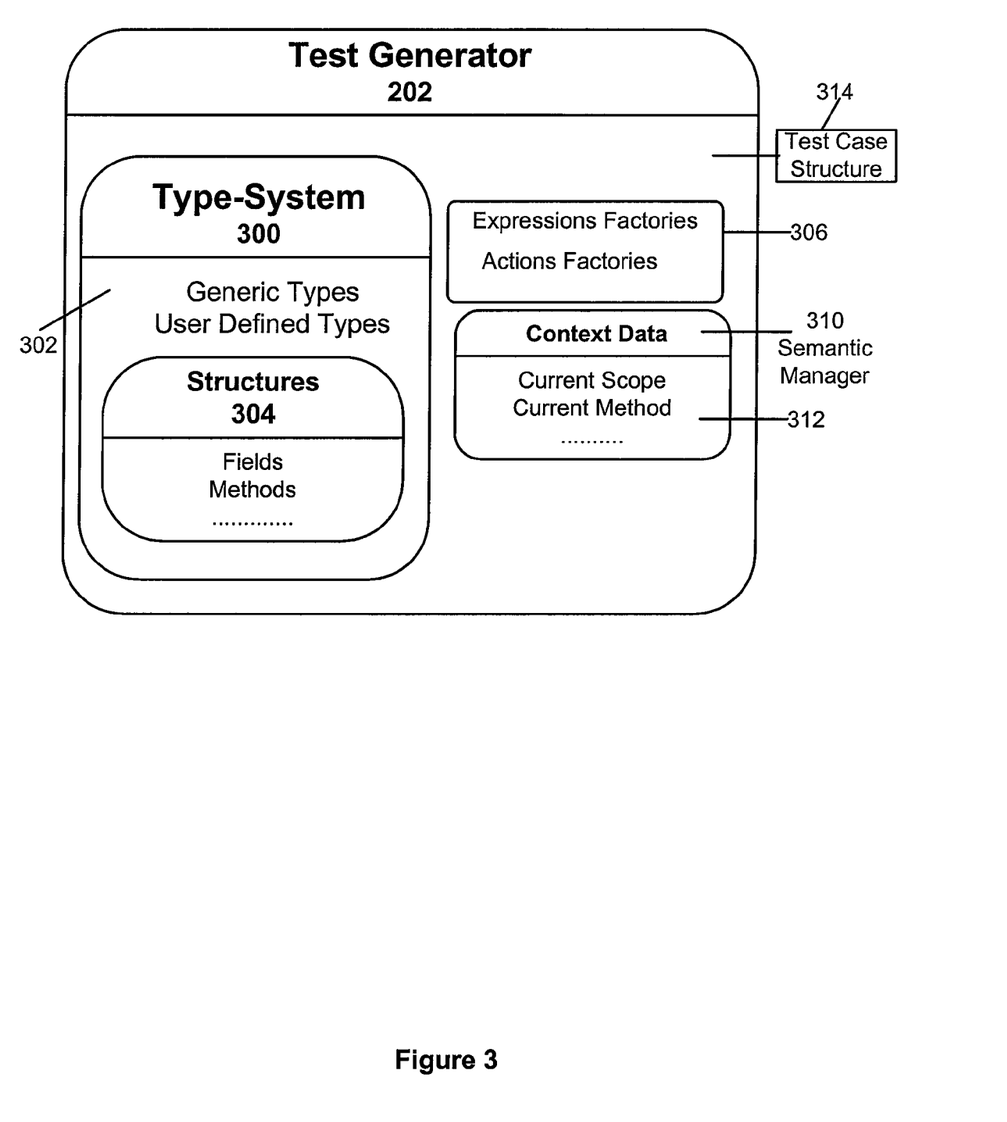
FIG. 3 is a block diagram of a test generator.

FIG. 3 is a block diagram of an approach for implementation of a Test Generator. The Test Generator 202 may access the Programming Language Element Library 206 to retrieve Element Definitions 300 of the programming language. By way of illustration, Test Generator 202 in FIG. 3 has Element Definitions of the Type System 300 supported by the Compiler 204 to be tested or verified. Those skilled in the art will recognize that the Type System is an example and that other aspects of a programming language may be tested with the automatic compiler verification approach. The Element Definitions for the Type System 300 in FIG. 3 have Generic Types 302, User Defined Types 302, and Structures 304. The Structures 304 of the programming language may contain the elements to be tested with the compiler.

The Element Definitions 300 may define actions and expressions that are permitted in the programming language. An element may be a composite of one or more elements or sub-elements. A Test Generator 202 may employ the use of Expression and Action Factories 306 to create the Test Case Structure 314 with elements that comply with legal programming language expressions and actions for the programming language. The Expression and Action Factories 306 constrain the type and characteristics of the sub elements. Each Element Definition 300 may have the Element Syntax Rules, Element Semantic Rules, and Element Self-Code Generation Options. The Element Self-Code Generation Options may allow for the display of results of the test of a particular element of the programming language. The Test Generator 202 builds a Test Case Structure 314 using the Element Definitions 300 in the Programming Language Library 206. The Test Case Structure 314 defines the test-case that will be generated by the Test Generator 202.

In one or more embodiments, the Test Case Structure 314 is a hierarchical structure such as a tree. Each node of the tree is an element of the programming language and each child of the node is a sub-element of the element. The Test Generator 202 creates a syntactically correct test-case with the hierarchical creation of the Test Case Structure 314 using the rules provided in the Element Definition 300. For example, a "plus" mathematic expression will have two operands required by the hierarchy.

In one or more embodiments, the Test Generator 202 is able to test the semantics of the programming language by using a Semantic Manager 310. A Semantic Manager 310 has the Current Context 312 for the test case as it is being generated and constrains the elements of the tree to be semantically correct. By way of illustration, Test Generator 202 in FIG. 3 has a Semantic Manager 310 with the current context data, including the current scope and methods 312 for the Test Case Structure 314. For example, a "plus" mathematic expression needs two operands as required by the hierarchy of the tree and the operands need to be of numeric type. Further, an operand that is a variable may need to be initialized to be of numeric type and the current scope may contain the information as to whether an operand is of numeric type and whether a variable has been initialized (e.g. int x; and int y; prior to the statement x=y+1). The syntax language tree construction may be accomplished by recursively building layers of tree elements, where each element is responsible for the creation of its sub-tree using the Test Generator 202 which is aware of the context for the elements being created.

Compiler testing consists of both legal and illegal tests as an input, so that syntactic/semantic error detection is provided as part of the testing process. Based on the structure of the tree, self checking code segments may be created by each code element and inserted at different points, according to the semantic restrictions. The tests may be enhanced by random insertion of noise mechanisms such as Garbage Collection and other language neutral actions. For example, tests may allow for statements that intend to free unused memory (e.g. delete, free) or check the value of variable to ensure that the garbage collection statements did not corrupt the variable value.

Figure 4:
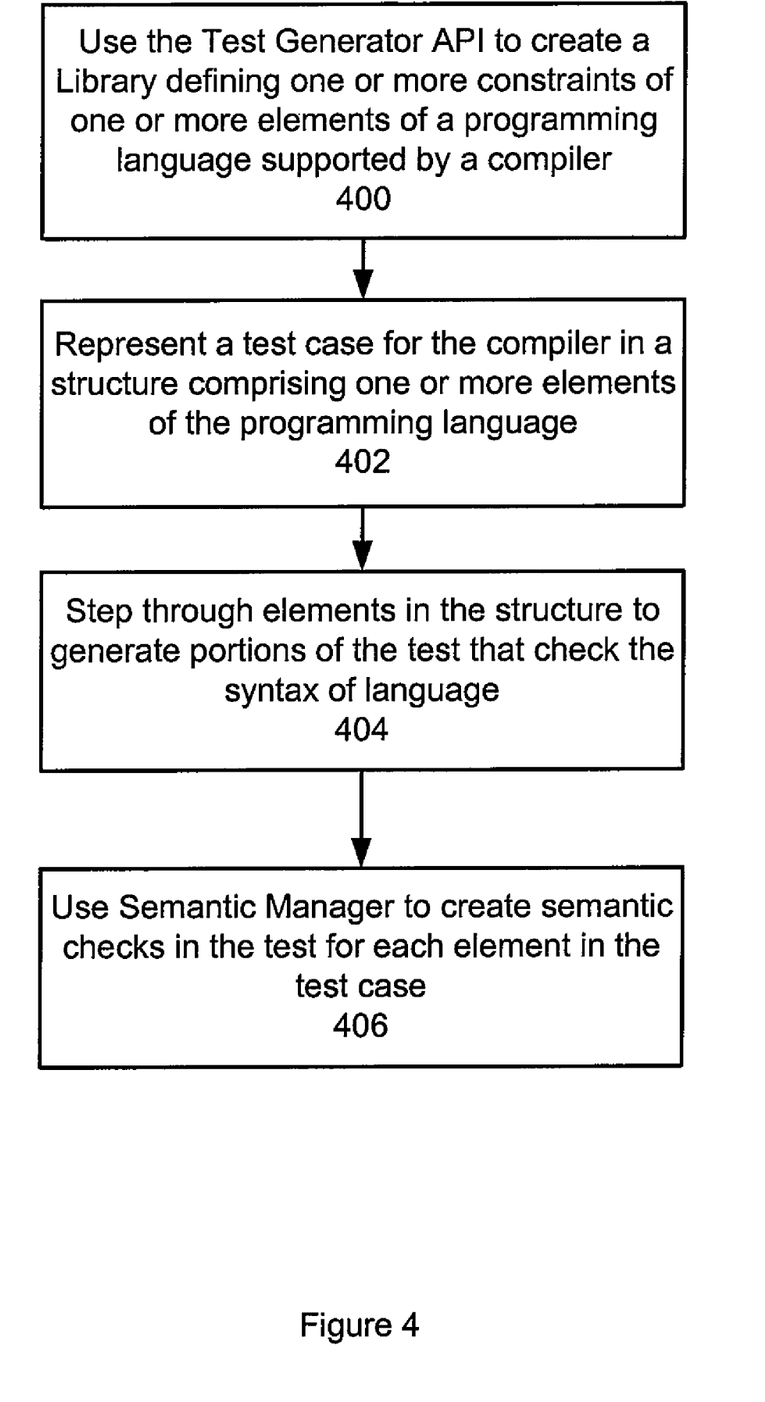
FIG. 4 is flowchart for an implementation of an automatic test generator for a compiler.

FIG. 4 is flowchart for an implementation of an automatic test generator for a compiler. A user may use the Test Generator API 200 to create a Programming Language Element Library 206 defining one or more elements of a programming language supported by a Compiler 204 with one or more constraints for the programming language (400). A test-case for the Compiler 204 is represented in a structure comprising one or more elements of the programming language (402).

Next, the Test Generator 202 steps through the elements in the structure to generate portions of the Test 208 (e.g. statements, actions, and expressions) that allow for checking the syntax of language either with legal or illegal test cases (404). The Test Generator 202 Semantic Manager 310 enforces or allows for the creation of statements for semantic checks in the Test 208 for each element in the test case (406). For example, a test with a legal statement "print 2+2" after the statement "main( ){" and before "}" should pass compilation and evaluate the expression to be 4, and the Semantic Manager 310 may allow for the inclusion of the "print 2+2" in a legal test only after the "main( ){" statement has been included in the test.

Figure 5:
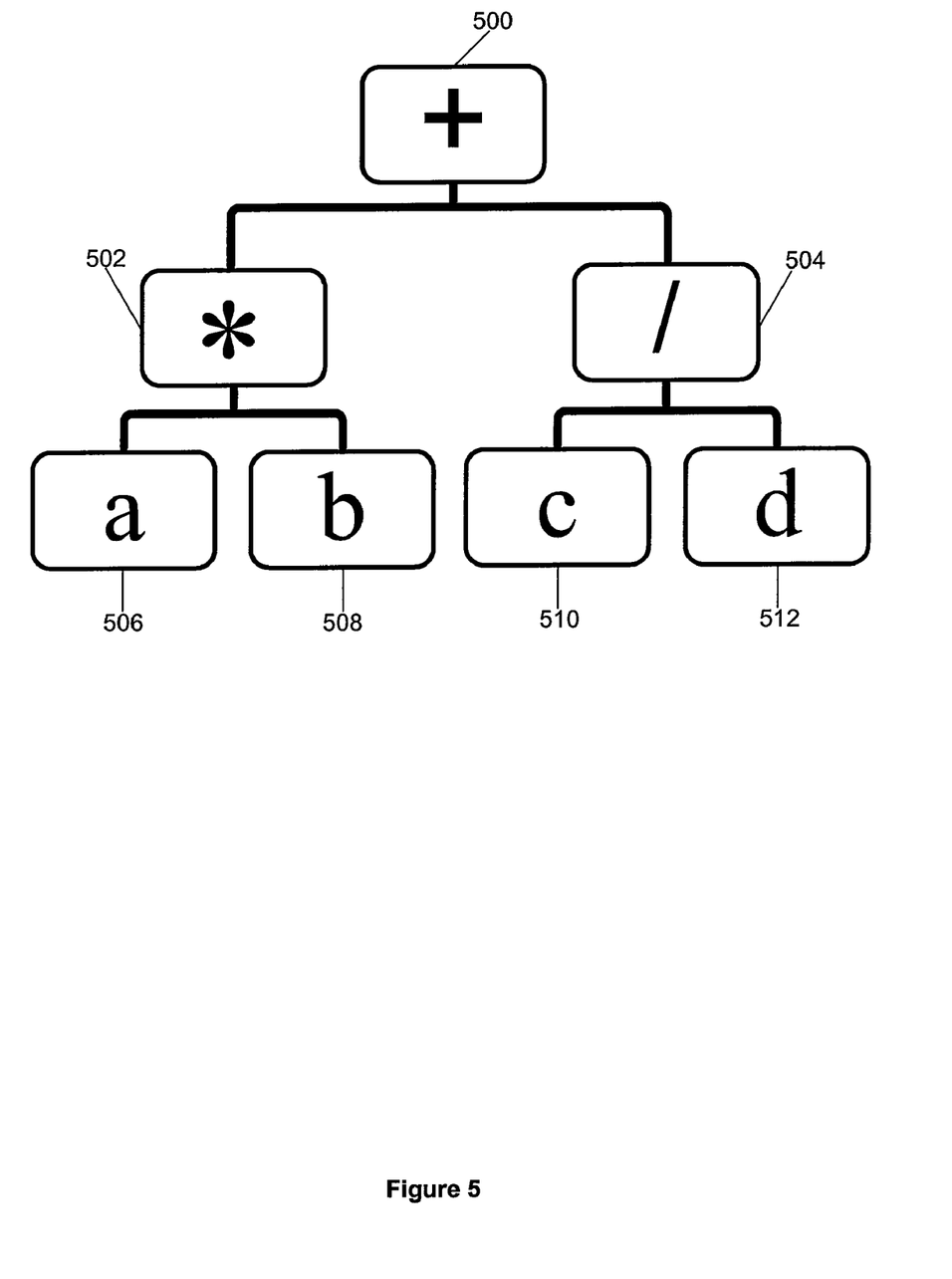
FIG. 5 illustrates an example of syntax language tree.

FIG. 5 illustrates an example of syntax language tree for an expression. In the syntax language tree of FIG. 5, the expression represented in the tree has a "+" operand element 500 that has two child or sub-elements, the "*" operand 502 and the "/" operand 504. Operand element "*" 502 has child elements, "a" 506 and "b" 508. Operand element 504 "/" has child elements, "c" 510 and "d" 512. Each of the mathematical operand elements "+", "/" and "*" in FIG. 5 have semantic rules that are associated with the elements. The semantic rules of the mathematical operands require that the elements or sub-elements of the operand elements to be numeric expressions. When a test is created from the test case represented in the tree structure of FIG. 5, the Semantic Manager 310 may be set at node 500 to have context data that indicates the need for a numeric expression to result from the expressions "a*b" and "c/d." As a result, the test can be created to check to ensure that a, b, c, and d are numeric expressions. For example the test can require the variables be checked as having a numeric value.

Figure 6:
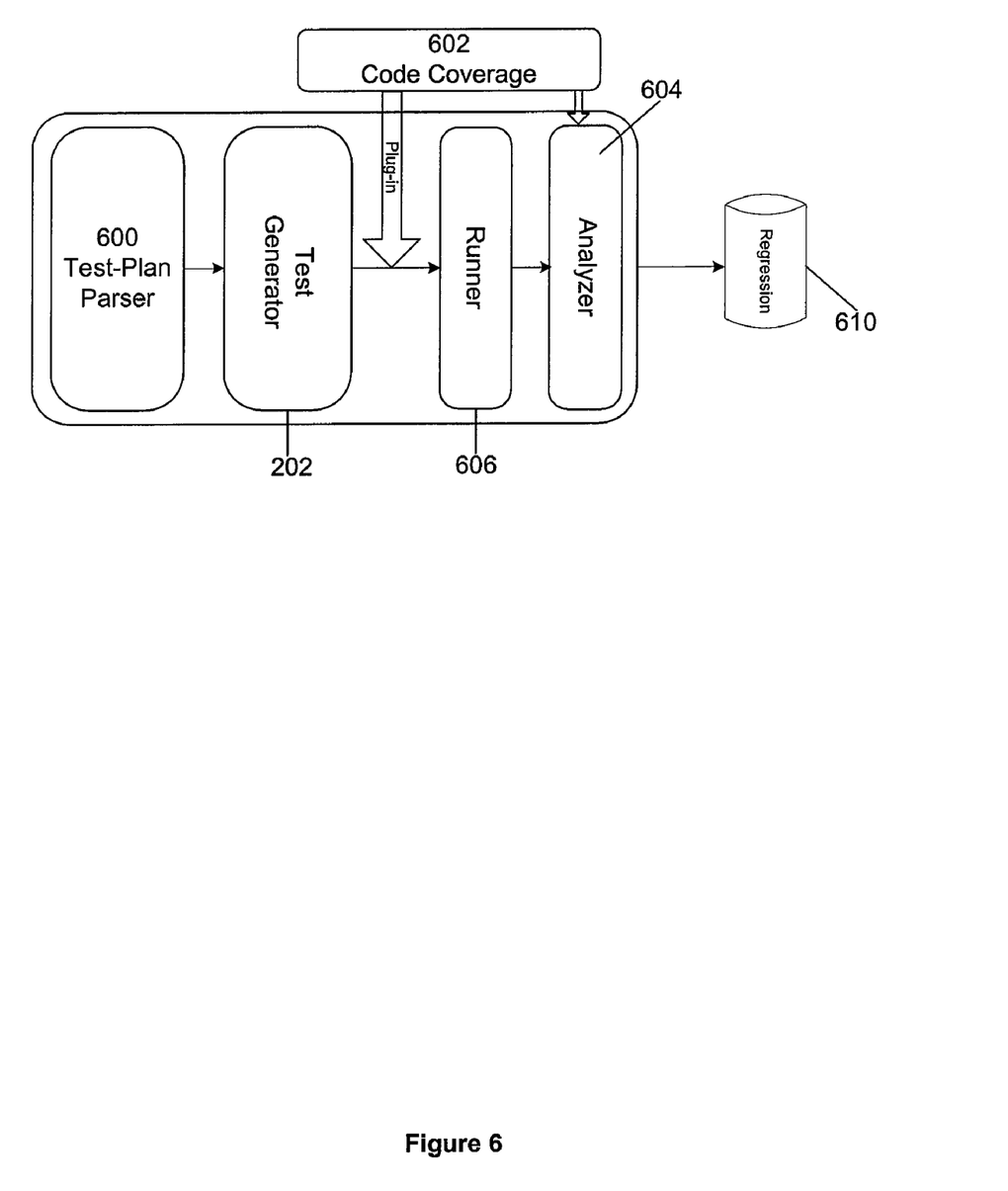
FIG. 6 is a block diagram of an implementation of an automatic test generator for a compiler.

FIG. 6 is a block diagram of an implementation of an automatic test generator for a compiler. The Test Generator 202 manages the automatic generation of syntactic-semantic self-checking tests. The programming language supported by the Compiler 204 to be tested is defined by Element Definitions 300 from a Programming Language Library 206. The common testing coverage for programming language verification, such as the language datatypes, actions, expressions and code contexts are encapsulated in the Element Definitions 300. Each Element Definition 300 may contain a self-check routine which is meant to be independent of the Test-Case Structure 312. The self-check routine is an external implementation for a check of the functionality of the element under test. In some embodiments, there is no dependency between the element code creation and the element self-check routine. The check of the functionality of an element is not coupled with its code appearance and yet can allow for defect detection. For example, a print statement for the value of an expression can be indicated in the results for a test.

The Test-Plan Parser 600 is an optional component of automatic test generation that allows the user to specify concrete aspects of the language to test and is useful when adding or changing an element in the language. The Test-Plan Parser may allow the user to define the coverage demands of a set of tests. By default, the requested coverage may be all the permutations of the defined elements. In one or more embodiments, the Test Plan Parser 600 may allow the user to specify the test of define corner cases of a programming language. For example, all datatypes that may appear in print actions may be designated by the user as a set of elements of the programming language to test. Often it is difficult to randomly create tests for interesting features of an action or an expression. For example, it may be useful to the user to check the assignment of negative number to an unsigned numeric type variable. The user may want to specify that the tests include particular input datatypes, actions, expressions, or contexts. For example, the user may desire to check that an assignment of a variable is correct in an "if" action statement and a "for" action statement.

The Code Coverage 602 is an optional component that may pass on the generated test-case syntax tree to collect information on the created elements and their dependencies with other elements. The generated tests can then be checked for their coverage of the programming language in the Analyzer 604.

The Analyzer 604 is responsible for managing the executed tests. The Analyzer 604 may receive the executed tests from the Runner and catalogues them in a database. The Analyzer 604 may report on the pass or failure of a test, and sort the tests and test results.

The Runner 606 is a connection with an external application that is responsible for compiling and running the tests. The runner may be as simple as running a shell command or use a more complex interface.

The tests may be stored for later regression testing in Regression 610 test storage. In one or more embodiments, the Regression test storage may be a database.

System Architecture Overview

In the following description, numerous details are set forth for purpose of explanation. However, one of ordinary skill in the art will realize that various embodiments of the invention may be practiced without the use of these specific details. In other instances, well-known structures and devices are shown in block diagram form in order not to obscure the description of various embodiments of the invention with unnecessary detail.

Figure 7:
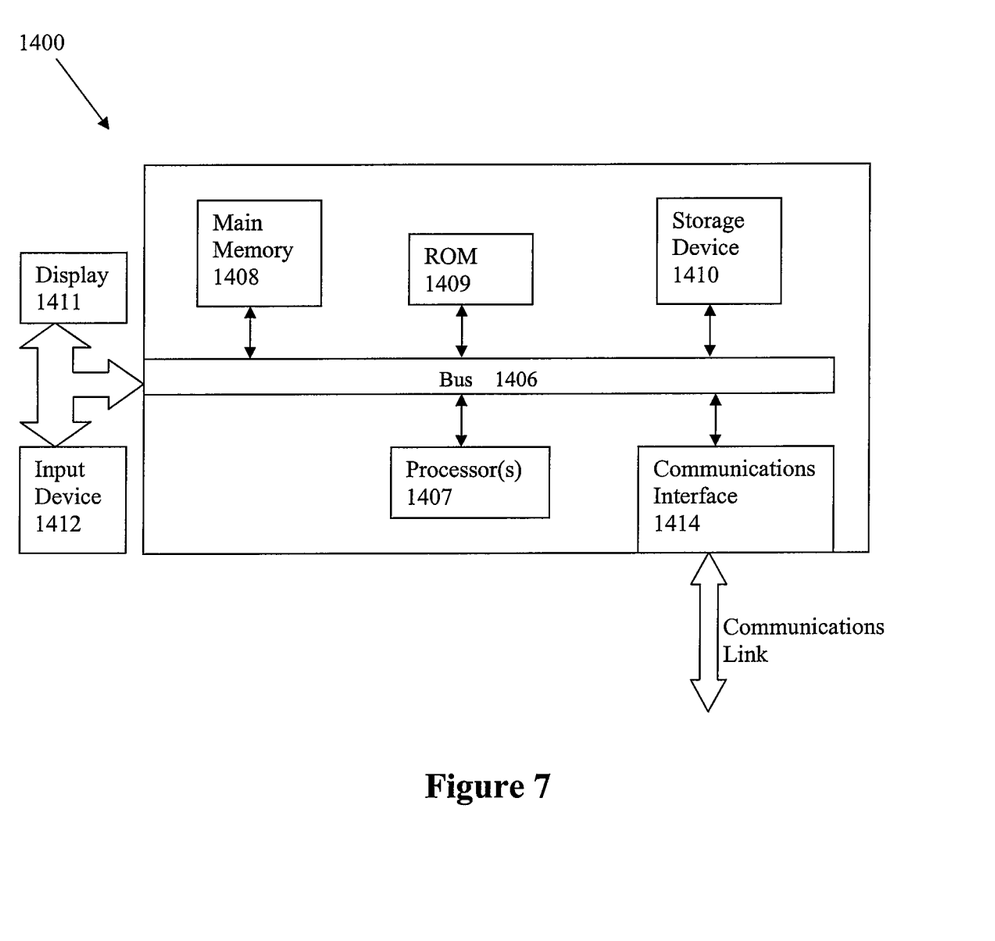
FIG. 7 is a block diagram of an architecture that can support implementation of an automatic test generator for a compiler.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. The method for automatic test generation for a compiler, comprising:
representing a test case for a compiler in a structure, wherein the structure comprises one or more elements of a programming language;
associating at least one syntactic rule and at least one semantic rule with at least one of the one or more elements in the structure;
generating, by using a processor, a test utilizing rules associated with the one or more elements of the structure to test the semantics of the programming language, in which self checking code segments are created by one or more code elements and inserted at different points in the structure according to semantic restrictions and the test includes insertion of a noise mechanism, wherein the noise mechanism does not corrupt a variable value;
compiling the test with the compiler to verify the compiler; and
displaying or storing results of the test.

2. The method of claim 1, wherein the structure is a syntax tree.

3. The method of claim 1, further comprising:
accessing context information for the test during generation of the test; and
determining the test content with the context information.

4. The method of claim 1, wherein the test generated is an illegal test case for the compiler.

5. The method of claim 1, wherein the structure is created with one or more class definitions for elements of the programming language.

6. The method of claim 1, in which the noise mechanism comprises a garbage collection statement.

7. A system for automatic test generation for a compiler, comprising:
  an interface for representing a test case for the compiler in a structure, wherein the structure comprises one or more elements of a programming language;
  a non-transitory computer usable medium comprising a library for associating at least one of the one or more elements in the structure with at least one syntactic rule and at least one semantic rule;
  a test generator comprising a processor for generating a test utilizing rules associated with the one or more elements of the structure to test the semantics of the programming language, wherein the test is compiled with the compiler to verify the compiler, in which self checking code segments are created by one or more code elements and inserted at different points in the structure according to semantic restrictions and the test includes insertion of a noise mechanism, wherein the noise mechanism does not corrupt a variable value; and
  a storage for storing results of the test.

8. The system of claim 7, wherein the structure is a syntax tree.

9. The system of claim 7, further comprising:
  a context manager for accessing context information for the test during generation of the test, wherein the test content is determined with the context information.

10. The system of claim 7, wherein the test generated is an illegal test case for the compiler.

11. The system of claim 7, wherein the structure is created with one or more class definitions for elements of the programming language.

12. The system of claim 7, in which the noise mechanism comprises a garbage collection statement.

13. A computer program product comprising a non-transitory computer usable medium storing executable code to execute a process using a processor for automatic test generation for a compiler, the process comprising:
  representing a test case for a compiler in a structure, wherein the structure comprises one or more elements of a programming language;
  associating at least one syntactic rule and at least one semantic rule with at least one of the one or more elements in the structure;
  generating, by using the processor, a test utilizing rules associated with the one or more elements of the structure to test the semantics of the programming language, in which self checking code segments are created by one or more code elements and inserted at different points in the structure according to semantic restrictions and the test includes insertion of a noise mechanism, wherein the noise mechanism does not corrupt a variable value;
  compiling the test with the compiler to verify the compiler based at least in part upon results of the test; and
  displaying or storing results of the test.

14. The computer program product of claim 13, wherein the structure is a syntax tree.

15. The computer program product of claim 13, further comprising:
  accessing context information for the test during generation of the test; and
  determining the test content with the context information.

16. The computer program product of claim 13, wherein the test generated is an illegal test case for the compiler.

17. The computer program product of claim 13, wherein the structure is created with one or more class definitions for elements of the programming language.

18. The computer program product of claim 13, in which the noise mechanism comprises a garbage collection statement.

* * * * *